(12) United States Patent
Lai

(10) Patent No.: US 10,113,849 B2
(45) Date of Patent: Oct. 30, 2018

(54) WHEELED DISTANCE MEASURING DEVICE

(71) Applicant: TOP MEASURE INSTRUMENT COMPANY, Taichung (TW)

(72) Inventor: Yin-Wu Lai, Taichung (TW)

(73) Assignee: TOP MEASURE INSTRUMENT COMPANY, Taichung (TW)

( * ) Notice: Subject to any disclaimer, the term of this patent is extended or adjusted under 35 U.S.C. 154(b) by 178 days.

(21) Appl. No.: 15/194,994

(22) Filed: Jun. 28, 2016

(65) Prior Publication Data

US 2017/0370687 A1  Dec. 28, 2017

(51) Int. Cl.
*G01B 3/12*  (2006.01)
*G01B 3/00*  (2006.01)

(52) U.S. Cl.
CPC ............... *G01B 3/12* (2013.01); *G01B 3/004* (2013.01)

(58) Field of Classification Search
CPC ...................................................... G01B 3/12
USPC ......... 33/782, 772, 773, 774, 775, 779, 780, 33/781
See application file for complete search history.

(56) References Cited

U.S. PATENT DOCUMENTS

| | | | | |
|---|---|---|---|---|
| 1,207,582 A * | 12/1916 | McKinney | ............... | G01B 3/12 235/91 R |
| 1,835,804 A * | 12/1931 | Morra | ..................... | G01B 3/12 235/91 R |
| 2,110,757 A * | 3/1938 | Clarke | ..................... | G01B 3/12 235/61 FB |
| 2,123,360 A * | 7/1938 | Harris | ..................... | G01B 3/12 235/95 R |
| 2,817,906 A * | 12/1957 | Hall | ........................ | G01B 3/12 33/772 |
| 3,716,919 A * | 2/1973 | Evans, Jr. | ............... | G01B 3/12 33/781 |
| 3,835,543 A * | 9/1974 | Polydoris | ................ | G01B 3/12 33/781 |
| 3,922,793 A * | 12/1975 | Gandrud | ................ | G01B 3/12 33/781 |
| 4,276,695 A * | 7/1981 | Stansbury, Jr. | .......... | G01B 3/12 33/781 |
| 4,970,802 A * | 11/1990 | Nosek | ..................... | G01B 3/12 235/95 B |
| 5,577,330 A * | 11/1996 | Cheng | ..................... | G01B 3/12 33/772 |
| 7,040,036 B1 * | 5/2006 | Wang | ..................... | G01B 3/12 33/772 |

(Continued)

*Primary Examiner* — Christopher W Fulton
(74) *Attorney, Agent, or Firm* — patenttm.us

(57) ABSTRACT

A wheeled distance measuring device has a longitudinal pole, a housing, a wheel, a gear coupling mechanism, and a transmission assembly. The housing is attached to the longitudinal pole and has a fork. The counter is mounted in the housing and has a spindle and a gear mounted on the spindle. The wheel is mounted rotatably on the fork and has an axle and a spur gear mounted on the axle. The gear coupling mechanism is mounted on the fork and has a stem, an upper spur gear, and a lower spur gear engaged with the spur gear on the axle of the wheel. The transmission assembly is mounted on the housing and has multiple gear elements. One of the gear elements is engaged with the gear on the spindle, and another one of the gear elements is engaged with the upper spur gear.

4 Claims, 6 Drawing Sheets

(56) References Cited

U.S. PATENT DOCUMENTS

| | | | |
|---|---|---|---|
| 7,574,815 B1* | 8/2009 | Lai | G01B 3/12 33/772 |
| 7,905,025 B1* | 3/2011 | Andersen | G01B 3/12 33/38 |
| 2006/0156573 A1* | 7/2006 | Huang | G01B 3/12 33/772 |

* cited by examiner

WHEELED DISTANCE MEASURING DEVICE

BACKGROUND OF THE INVENTION

1. Field of the Invention

The present invention relates to a wheeled distance measuring device, and more particularly to a wheeled distance measuring device for fitting with different parts or elements in different scales, units or systems, such as the metric and the British Imperial scales.

2. Description of Related Art

A conventional wheeled distance measuring device substantially comprises a frame, a wheel, a counter, and a gear coupling mechanism. The wheel is rotatably attached to the frame. The counter is mounted on the frame. The gear coupling mechanism is coupled between the wheel and the counter for allowing the counter to be operated or actuated by the wheel and for conducting the distance measuring operations.

However, the gear coupling mechanism and the counter of the conventional measuring device are only applied for one single scale system, such as for the metric or the British Imperial scale system. The gear coupling mechanism and the counter should all be changed when a different scale system is adopted. Therefore, the conventional wheeled distance measuring device is not versatile in use.

To overcome the shortcomings, the present invention tends to provide a wheeled distance measuring device to mitigate or obviate the aforementioned problems.

SUMMARY OF THE INVENTION

The main objective of the invention is to provide a wheeled distance measuring device that can fit with different parts or elements in different scale systems.

The wheeled distance measuring device has a longitudinal pole, a housing, a wheel, a gear coupling mechanism, and a transmission assembly. The longitudinal pole has a lower portion. The housing is attached to the lower portion of the longitudinal pole and has a fork extending from the housing. The counter is mounted in the housing and has a spindle having an end extending out of the housing and a gear mounted on the end of the spindle. The wheel is mounted rotatably on the fork of the housing and has an axle and a spur gear mounted on a free end of the axle. The gear coupling mechanism is mounted on the fork and has a stem, an upper spur gear, and a lower spur gear. The stem is mounted rotatably on the fork and has two ends. The upper spur gear and the lower spur gear are mounted respectively on the two ends of the stem. The lower spur gear is engaged with the spur gear on the axle of the wheel. The transmission assembly is mounted on the housing between the gear on the spindle of the counter and the upper spur gear and has multiple gear elements. One of the gear elements is engaged with the gear on the spindle of the counter, and another one of the gear elements is engaged with the upper spur gear.

Other objects, advantages and novel features of the invention will become more apparent from the following detailed description when taken in conjunction with the accompanying drawings.

DETAILED DESCRIPTION OF PREFERRED EMBODIMENT

Figure 1:
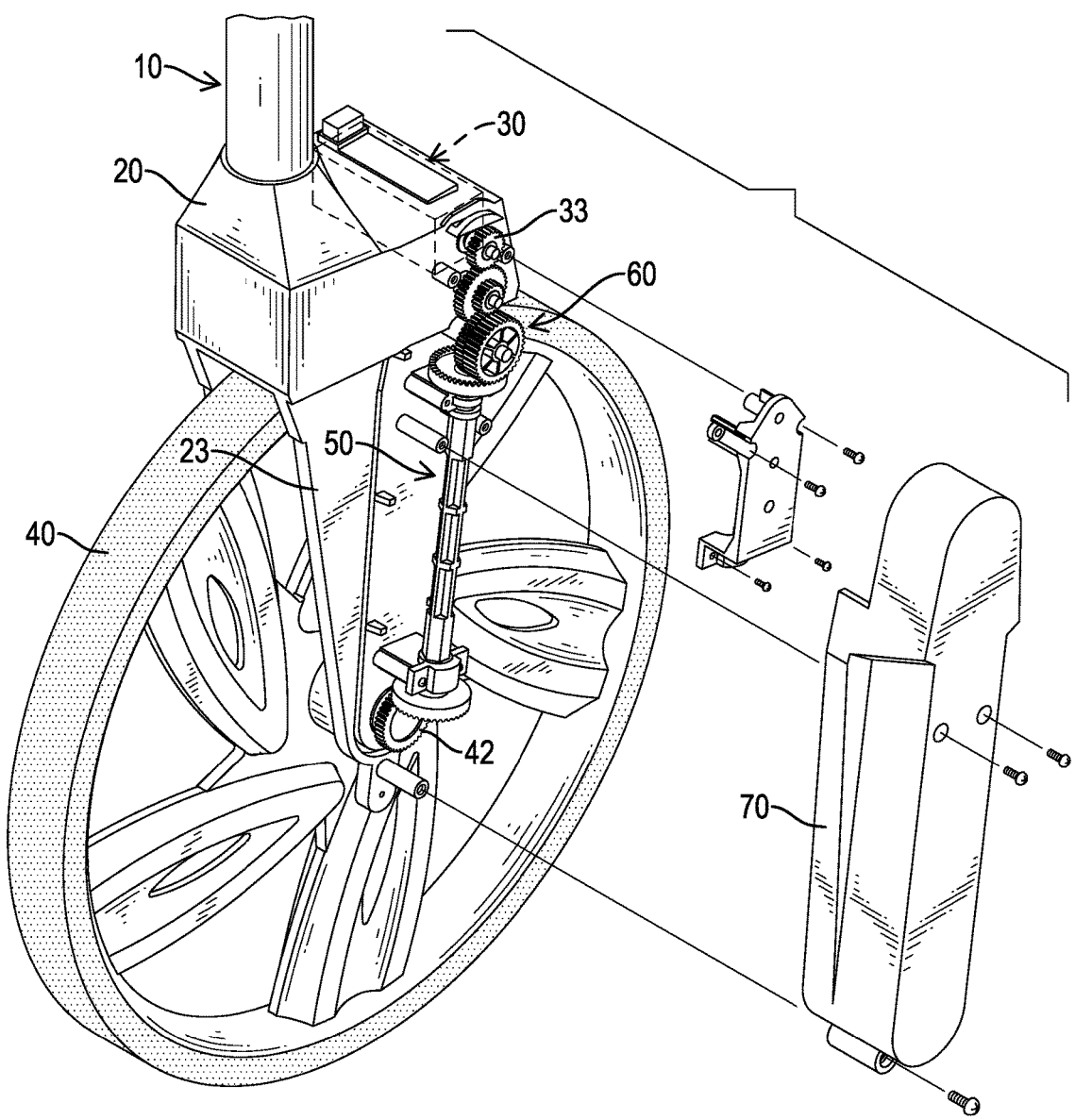
FIG. 1 is a partially exploded perspective view of a wheeled distance measuring device in accordance with the present invention.
Figure 2:
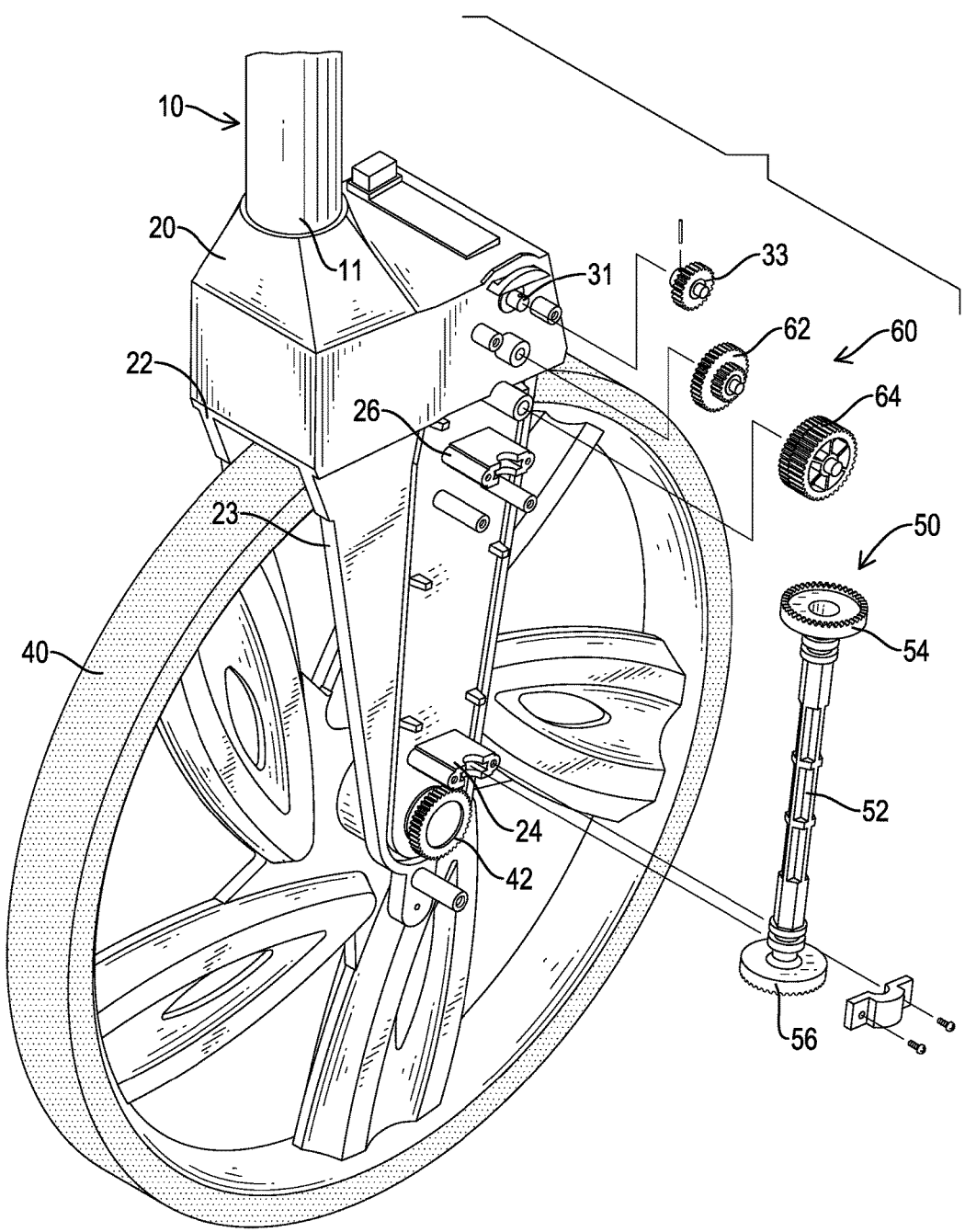
FIG. 2 is another partially exploded perspective view of the wheeled distance measuring device in FIG. 1.

With reference to FIGS. 1 and 2, a wheeled distance measuring device in accordance with the present invention comprises a longitudinal pole 10, a housing 20, a counter 30, a wheel 40, a gear coupling mechanism 50, a transmission assembly 60 and a cover 70.

The longitudinal pole 10 may be telescopic or foldable and has a lower portion 11. The housing 20 is mounted on the lower portion 11 of the longitudinal pole 10 and has a fork 23, an upper supporting protrusion 26, and a lower holding protrusion 24. The fork 23 is mounted on and extends downwardly from the housing 20. The upper supporting protrusion 26 is formed on and protrudes from an upper portion of the fork 23. The lower holding protrusion 24 is formed on and protrudes from a lower portion of the fork 23.

The counter 30 is mounted in the housing 20 and has a spindle 31. The spindle 31 has an end extending out of the housing 20 and is provided with a gear 33.

The wheel 40 is mounted rotatably on the fork 23 of the housing 20. The wheel 40 has an axle 41 and a spur gear 42 mounted on a free end of the axle 41.

The gear coupling mechanism 50 is mounted on the fork 23 and has a stem 52, an upper spur gear 54, and a lower spur gear 56. The stem 52 is rotatably mounted on and supported by the upper supporting protrusion 26 and the lower holding protrusion 24 of the housing 20 and has two ends. The upper spur gear 54 and the lower spur gear 56 are mounted respectively on the two ends of the stem 52. The lower spur gear 56 is engaged with the spur gear 42 on the axle 41 of the wheel 40.

The transmission assembly 60 is mounted on the housing 20 between the gear 33 on the spindle 31 of the counter 30 and the upper spur gear 54. The transmission assembly 60 comprises multiple gear elements 62,64. One of the gear elements 62 is engaged with the gear 33 on the spindle 31 of the counter 30, and another one of the gear elements 64 is engaged with the upper spur gear 54.

The cover 70 is attached to the housing 20 to hold the gear coupling mechanism 50 and the transmission assembly 60 inside.

Figure 3:
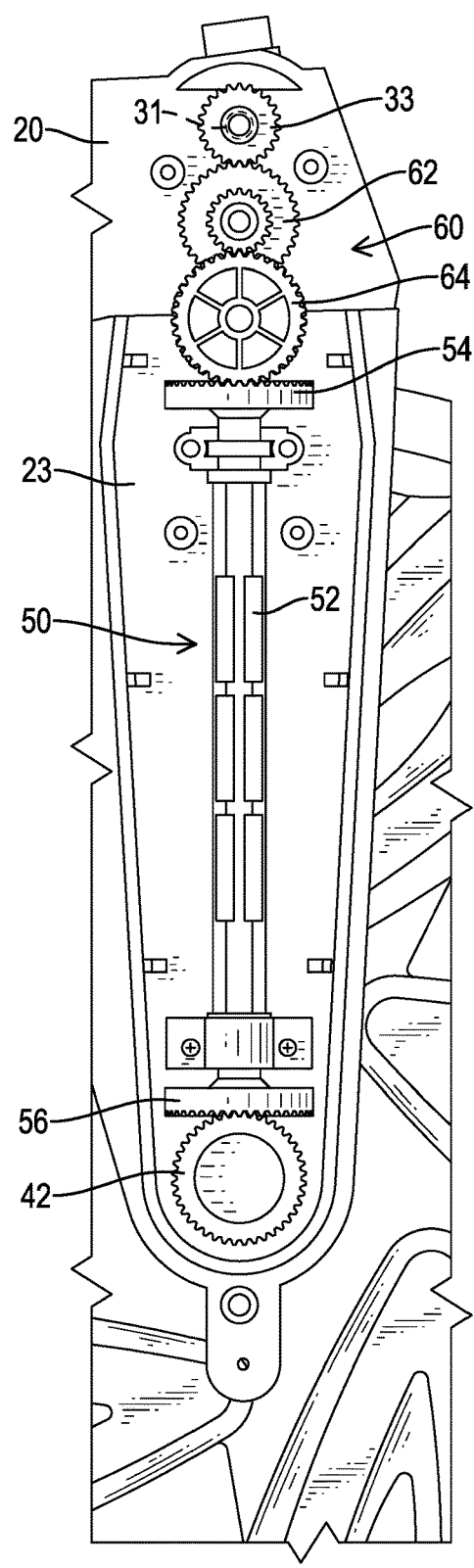
FIG. 3 is an enlarged front view of the wheeled distance measuring device in FIG. 1.
Figure 4:
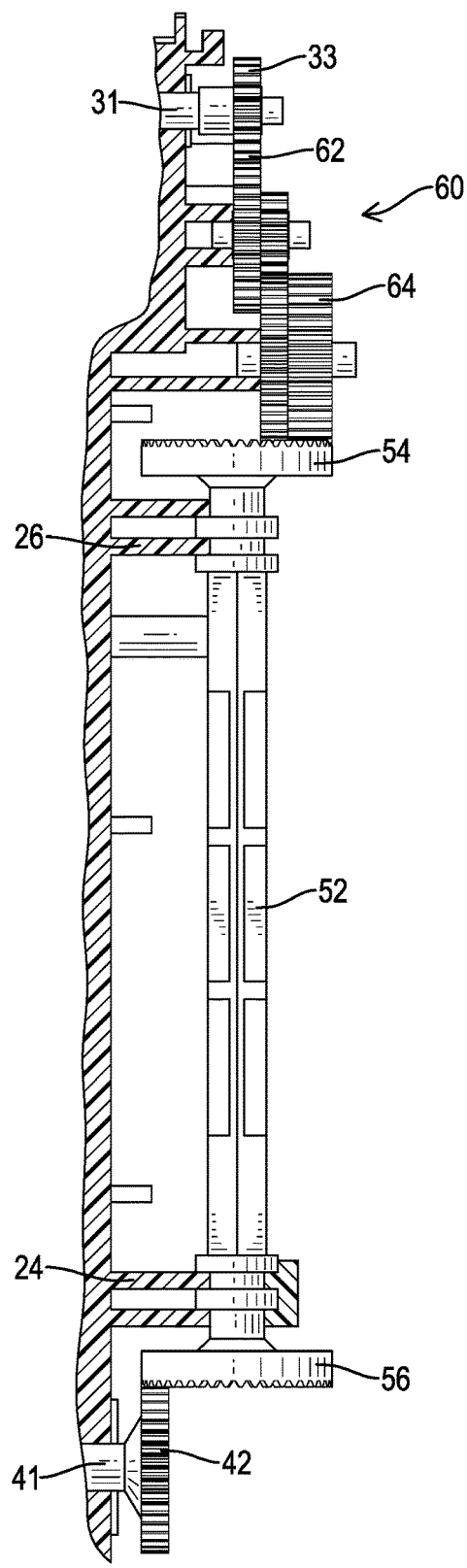
FIG. 4 is an enlarged side view in partial section of the wheeled distance measuring device in FIG. 1.

With reference to FIGS. 3 and 4, in use, the gear 33 can be chosen to have a small diameter for the British Imperial scale system. The gear elements 62,64 of the transmission assembly 60 are also chosen based on the gear 33 of the small diameter. Accordingly, when the wheel 40 is rotated on the ground, the rotation of the wheel 40 will drive the counter 30 to operate for measuring distance in the British Imperial scale with the transmission of the axle 41, the spur gear 42, the coupling mechanism 50, the gear elements 62,64 of the transmission assembly 60, the gear 33, and the spindle 31.

Figure 5:
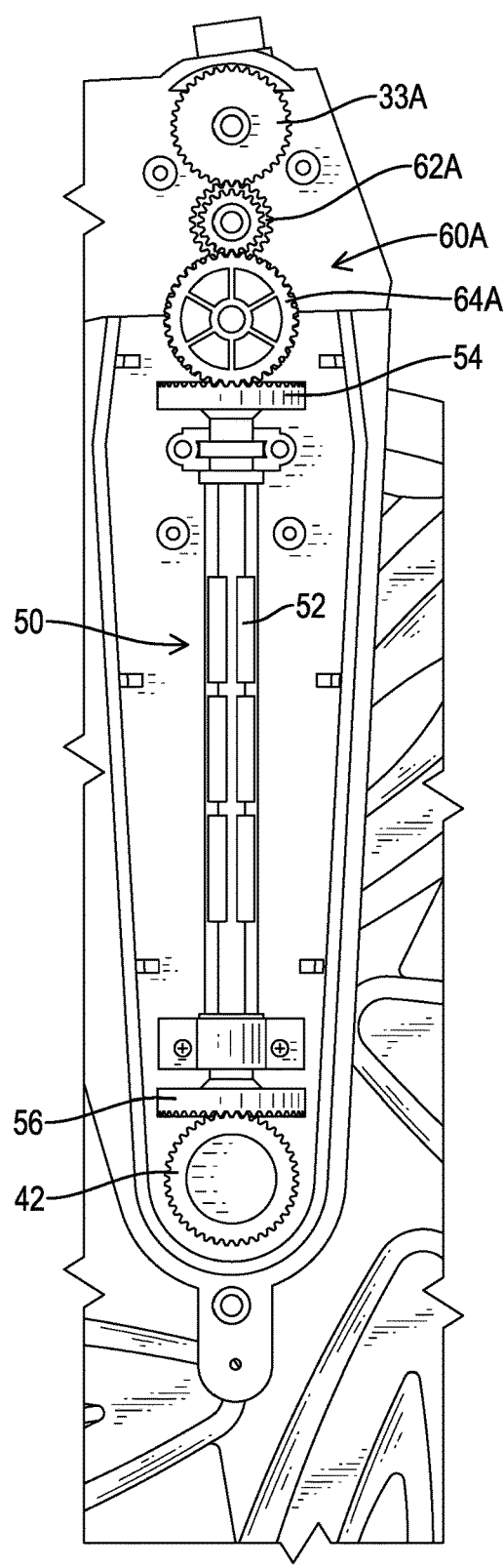
FIG. 5 is an enlarged front view of an alternative embodiment of the wheeled distance measuring device in FIG. 1.
Figure 6:
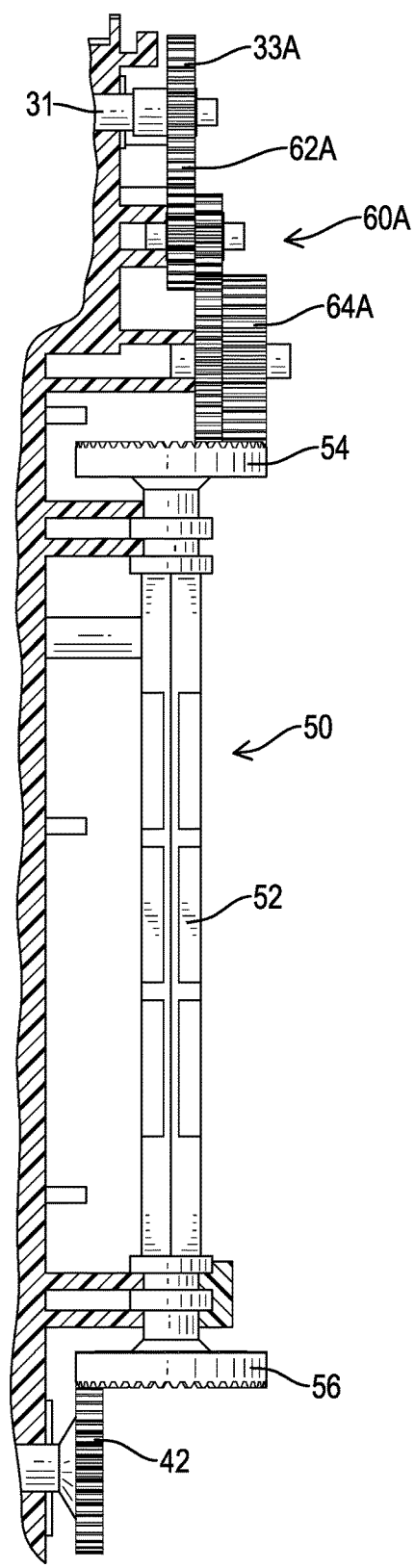
FIG. 6 is an enlarged side view in partial section of the alternative embodiment of the wheeled distance measuring device in FIG. 5.

Alternatively, with reference to FIGS. 5 and 6, the gear 33A is chosen to have a large diameter for a metric scale system, and the gear elements 62A,64A of the transmission assembly 60A are chosen based on the gear 33A with the large diameter. Accordingly, the wheeled distance measuring device can be applied to measure distance in a metric scale system.

Therefore, the wheeled distance measuring device in accordance with the present invention can be used for both the metric and the British Imperial scales and is versatile in use.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A wheeled distance measuring device comprising:
   a longitudinal pole having a lower portion;
   a housing attached to the lower portion of the longitudinal pole and having a fork extending from the housing;
   a counter mounted in the housing and having a spindle having an end extending out of the housing and a gear mounted on the end of the spindle;
   a wheel mounted rotatably on the fork of the housing and having an axle and a spur gear mounted on a free end of the axle;
   a gear coupling mechanism mounted on the fork and having
   a stem mounted rotatably on the fork, formed as a single piece, and having two ends;
   an upper spur gear and a lower spur gear mounted respectively on the two ends of the stem, and the lower spur gear engaged with the spur gear on the axle of the wheel;
   a transmission assembly mounted on the housing between the gear on the spindle of the counter and the upper spur gear and having multiple gear elements, wherein one of the gear elements is engaged with the gear on the spindle of the counter, another one of the gear elements is engaged with the upper spur gear, and all of the gear elements of the transmission assembly are spur gears.

2. The wheeled distance measuring device as claimed in claim 1, wherein
   the housing further has
   an upper supporting protrusion formed on and protruding from an upper portion of the fork; and
   a lower holding protrusion formed on and protruding from a lower portion of the fork; and
   the stem is rotatably mounted on and supported by the upper supporting protrusion and the lower holding protrusion.

3. The wheeled distance measuring device as claimed in claim 2 further comprising a cover attached to the housing to hold the gear coupling mechanism and the transmission assembly inside.

4. The wheeled distance measuring device as claimed in claim 1 further comprising a cover attached to the housing to hold the gear coupling mechanism and the transmission assembly inside.

* * * * *